United States Patent
Strauss et al.

(10) Patent No.: US 10,614,059 B1
(45) Date of Patent: Apr. 7, 2020

(54) SHADOW TAGGING TO EVALUATE CONTENT REVIEW POLICY CHANGES

(71) Applicant: Facebook, Inc., Menlo Park, CA (US)

(72) Inventors: Emanuel Alexandre Strauss, San Mateo, CA (US); Aswin Gigi Mampilly, Austin, TX (US); Joseph Rhyu, San Francisco, CA (US); Dilan Chaturanga Edirisinghe, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 288 days.

(21) Appl. No.: 15/862,709

(22) Filed: Jan. 5, 2018

Related U.S. Application Data (63) Continuation of application No. 15/853,685, filed on Dec. 22, 2017, now abandoned.

(51) Int. Cl.
*H04L 29/06* (2006.01)
*G06F 16/23* (2019.01)
*G06F 16/28* (2019.01)
*G06F 16/9535* (2019.01)

(52) U.S. Cl.
CPC ........ *G06F 16/2365* (2019.01); *G06F 16/287* (2019.01); *G06F 16/9535* (2019.01)

(58) Field of Classification Search
CPC .................................................. G06F 16/2365
See application file for complete search history.

(56) References Cited

U.S. PATENT DOCUMENTS

| | | | | |
|---|---|---|---|---|
| 8,311,950 | B1* | 11/2012 | Kunal | G06Q 30/0201 705/319 |
| 8,601,596 | B2* | 12/2013 | Wu | G06F 21/10 726/1 |
| 9,400,999 | B2* | 7/2016 | Sutton | G06Q 50/01 |
| 9,461,958 | B1* | 10/2016 | Green | G06F 16/435 |
| 2016/0299563 | A1* | 10/2016 | Stafford | G02B 27/017 |
| 2017/0068964 | A1* | 3/2017 | Gevka | G06Q 30/018 |
| 2018/0349942 | A1* | 12/2018 | Mu | G06Q 30/0242 |
| 2019/0073593 | A1* | 3/2019 | Luo | G06F 21/6218 |

OTHER PUBLICATIONS

Hashemi, Yasamine. "Facebook's privacy policy and its third-party partnerships: Lucrativity and liability." BuJ Sci. & tEch. L. 15 (2009): 140. (Year: 2009).*

* cited by examiner

*Primary Examiner* — Shawnchoy Rahman
(74) *Attorney, Agent, or Firm* — Fenwick & West LLP (57) ABSTRACT

An online system reviews content for violation of one or more policies of the system. The system may evaluate various content policies to determine how usage of the policy affects user experience and what content is shown to each user. The system can, for example, run an A/B validation for certain policies, such as before launching a new policy. To enable the validation, when content is determined to be violating a policy, it is labeled with the specific policy violated as a shadow tag that is not visible to the user viewing the content. Then, the system may track user interactions with newsfeeds of content that include no policy violating content and newsfeeds that include some policy-violating content, and detect at a policy-by-policy level how each policy affects the newsfeed and user experience.

20 Claims, 4 Drawing Sheets

SHADOW TAGGING TO EVALUATE CONTENT REVIEW POLICY CHANGES

CROSS REFERENCE TO RELATED APPLICATIONS

This application is a continuation of U.S. application Ser. No. 15/853,685, filed Dec. 22, 2017, which is incorporated by reference in its entirety.

BACKGROUND

This disclosure relates generally to reviewing content for online systems, and more specifically to validating content policies for evaluating content.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user (i.e., user-provided content) may be declarative information provided by a user, status updates, images, photographs, videos, text data, any other information a user wishes to share with other users of the online system, or a combination thereof. User-provided content may include sponsored content that a sponsoring user (e.g., an organization) requests to be presented to other users who are not necessarily connected with the sponsoring user.

To ensure a high-quality user experience, online systems may remove low-quality content having characteristics violating a content policy such that this content provided by a content provider is not actually delivered to users or is revised before delivery. Content may be deemed low-quality because it contains offensive, unintelligible, or malicious elements. Offensive elements include text, images, or videos that are suggestive, violent, sensational, or illegal. Unintelligible elements include poor grammar, illegible words, words in a language different from a user's language, or an image obscured by overlaid text. Malicious elements may collect private information, misrepresent a product or service, or deliver malware to a user's computer.

New content policies that restrict what content is delivered to users are typically deployed across the entire set of users of the online system without a validation process. As a result, it is difficult to predict user response of the new content policies prior to deployment.

SUMMARY

A computer-implemented method and system described here provide a mechanism for evaluating policies that are used in reviewing content to be provided to users (e.g., reviewing for content that may be offensive, sensational, spam-like, etc.). But since it is unclear how any given policy may affect what content is delivered to users or affect user experience, these policies are first tested by showing some users the policy-violating content, but where each content item is labeled with the specific policy that it violates in a manner such that the label is hidden from the user when the user sees the content (e.g., shadow tagging of content).

The online method and system include storing a plurality of content policies. Each content policy specifies one or more constraints on content items that define when a content item violating a content policy will be withheld from users of the online system, such as by being withheld from newsfeed sent to users. For each of the plurality of content policies, the system tags content items that violate the content policy with a content policy identifier of each content policy violated. The system receives a request to validate a content policy from the plurality of content policies that will result in content being withheld from the users of the online system. The online system identifies a first and second set of users of the online system for validation of the content policy.

For each user of the second set of users, the system generates and sends an approved content newsfeed that includes only approved content items that do not violate any of the plurality of content items. The system identifies a subset of tagged content items that are each tagged with the content policy identifier for at least one of the identified content policies to be validated that is violated by the content item. For each user of the first set of users, the system generates and sends an alternative newsfeed that includes (1) tagged content items from the subset of tagged content items that violate at least one of the identified content polices to be validated, and (2) approved content items that do not violate any of the plurality of content policies. The system monitors user interactions of the first set of users with content items of the alternative newsfeed and user interactions of the second set of users with content items of the newsfeed of approved content items, and evaluates, based on each content policy identifier, the content policy that corresponds to the content policy identifier based on a comparison of the monitored user interactions of the first set of users with the monitored user interactions of the second set of users. The system modifies one or more of the plurality of content policies in response to the comparison indicating that the content policy corresponding to the content policy identifier requires adjustment to its parameters, and the system provides for display to additional users newsfeeds including content items that conform to each of the modified content policies.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

An online system reviews content for violation of one or more policies of the system. The system may evaluate various content policies to determine how usage of the policy affects user experience and what content is shown to each user. The system can, for example, run an AB validation for certain policies, such as before launching a new policy. To enable the validation, when content is determined to be violating a policy, it is labeled with the specific policy violated. This labeling is an internal shadow tag or hidden label that is recognized by the online system but is not visible to users of the online system that receive the content. In other words, the system provides the policy-violating content to certain users and withholds it from other users, and then it compares the result. Since the content is shadow tagged with a specific policy that is violated (e.g., policy preventing offensive language), the online system can track user response to that particular policy as compared to user response to other policies (e.g., policy preventing sexually explicit content). Thus, the system can evaluate the appropriateness and effectiveness of each policy at a policy-by-policy level, and can revise policies to improve effectiveness or better the user experience (e.g., if a policy is too strict or not strict enough, it can be relaxed).

System Architecture

Figure 1:
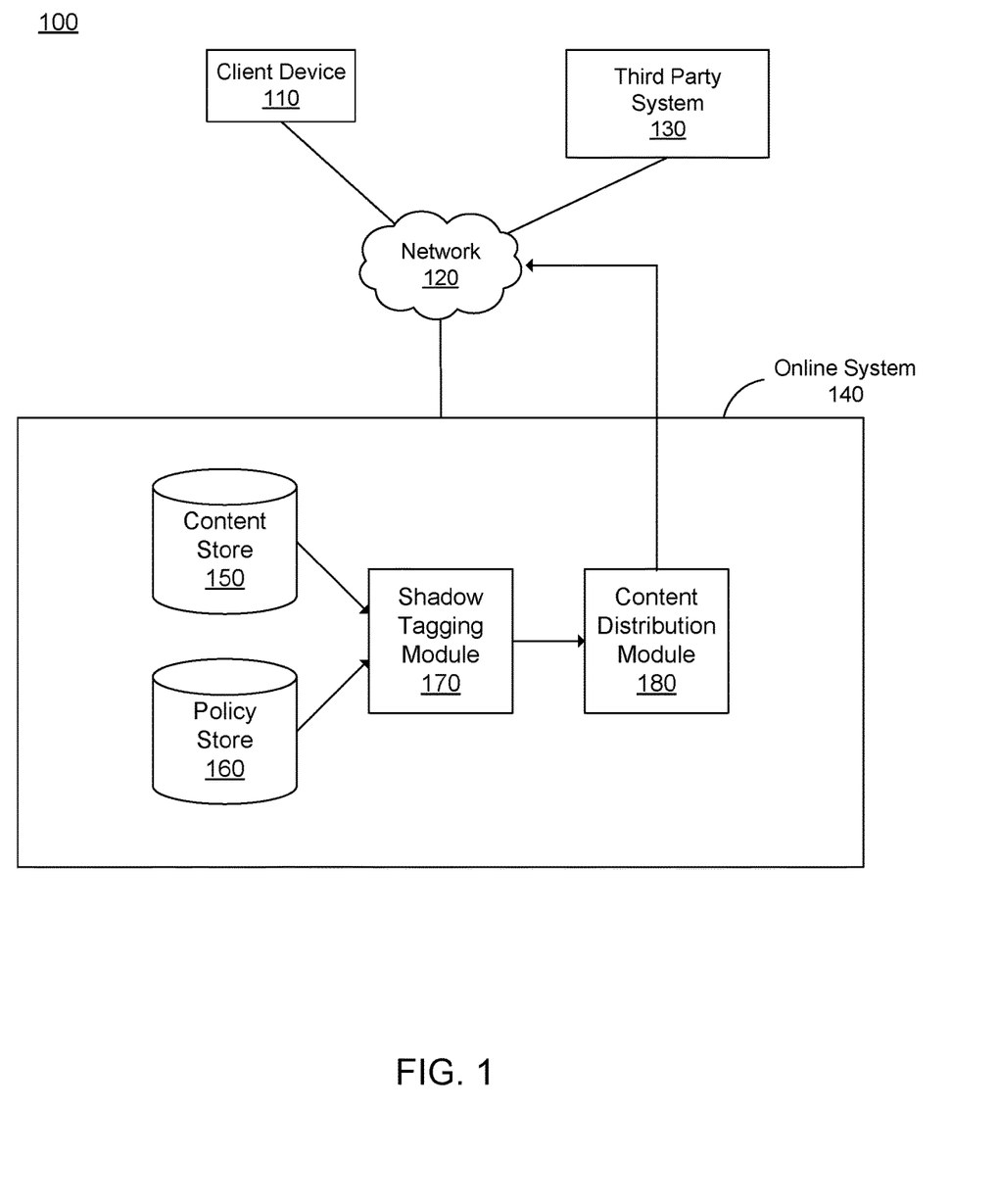
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130. For example, the third party system may provide advertisements to the online system for display to users of the online system. The online system 140 is coupled to the network 120 and includes, among other components, a content store 150, a policy store 160, a shadow tagging module 170, and a content distribution module 180, each of which are described in detail below with reference to FIG. 2. The content store 150 provides content to the shadow tagging module 170 and the policy store 160 provides content policies to the shadow tagging module 170. The shadow tagging module 170 tags content items violating a content policy with an identifier associated with the violated content policy and provides the content items to the content distribution module 180. The content distribution module 180 distributes the content items to the network 120 for publishing via the online system 140.

Figure 2:
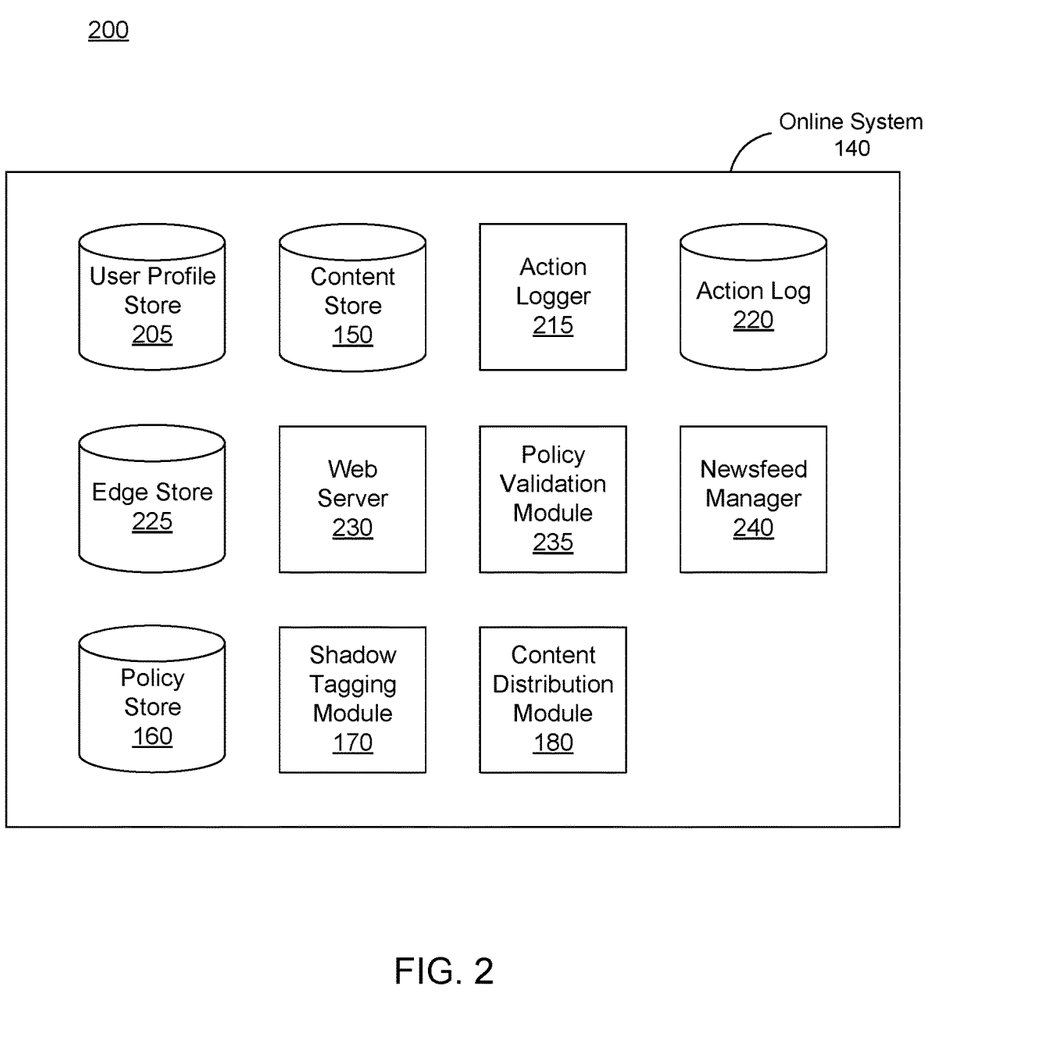
FIG. 2 is a block diagram of an online system, in accordance with an embodiment.

FIG. 2 is a block diagram of an architecture of the online system 140. The online system 140 shown in FIG. 2 includes a user profile store 205, a content store 150, an action logger 215, an action log 220, an edge store 225, a policy store 160, a shadow tagging module 170, a policy validation module 235, a content distribution module 180, and a web server 230. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 150 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 150 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 150, such as status updates, photos tagged by users to be associated with other objects in the online system 140, events, groups or applications. In some embodiments, objects are received from third-party applications or third-party applications separate from the online system 140. In one embodiment, objects in the content store 150 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network or social graph of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In one embodiment, the online system 140 identifies stories likely to be of interest to a user through a "newsfeed" presented to the user. The newsfeed can include a feed of organic content posted by other users of the online system (e.g. status updates, shared news articles, posts of personal photos and videos, etc.), can include a feed of commerce related content posted by users (e.g. content related to particular products of interest to the users), a feed that includes a combination of both of these, and can also include a feed of a variety of mixed content types (e.g., advertisements, organic content, commerce-related content, suggestions from the online system for other users you might connect with, etc.). In some embodiments, there could be two different types of feed available to the user to view in different tabs within the online system (e.g., an organic content tab feed vs. a commerce or marketplace tab feed), including possibly a main tab that has a mix of all of the content types in a single feed. A story presented to a user describes an action taken by an additional user connected to the user and identifies the additional user. In some embodiments, a story describing an action performed by a user may be accessible to users not connected to the user that performed the action. The newsfeed manager 240 may generate stories for presentation to a user based on information in the action log 220 and in the edge store 225 or may select candidate stories included in the content store 150. One or more of the candidate stories are selected and presented to a user by the newsfeed manager 240.

For example, the newsfeed manager 240 receives a request to present one or more stories to an online system user. The newsfeed manager 240 accesses one or more of the user profile store 205, the content store 150, the action log 220, and the edge store 225 to retrieve information about the identified user. For example, stories or other data associated with users connected to the identified user are retrieved. The retrieved stories or other data are analyzed by the newsfeed manager 240 to identify candidate content items, which include content having at least a threshold likelihood of being relevant to the user. For example, stories associated with users not connected to the identified user or stories associated with users for which the identified user has less than a threshold affinity are discarded as candidate stories. Based on various criteria, the newsfeed manager 240 selects one or more of the candidate stories for presentation to the identified user.

In various embodiments, the newsfeed manager 240 presents stories to a user through a newsfeed including a plurality of stories selected for presentation to the user. The newsfeed may include a limited number of stories or may include a complete set of candidate stories. The number of stories included in a newsfeed may be determined in part by a user preference included in user profile store 205. The newsfeed manager 240 may also determine the order in which selected stories are presented via the newsfeed. For example, the newsfeed manager 240 determines that a user has a highest affinity for a specific user and increases the number of stories in the newsfeed associated with the specific user or modifies the positions in the newsfeed where stories associated with the specific user are presented.

The newsfeed manager 240 may also account for actions by a user indicating a preference for types of stories and selects stories having the same, or similar, types for inclusion in the newsfeed. Additionally, the newsfeed manager 240 may analyze stories received by the online system 140 from various users to obtain information about user preferences or actions from the analyzed stories. This information may be used to refine subsequent selection of stories for newsfeeds presented to various users.

The policy store 160 stores a plurality of content policies. Each content policy specifies one or more constraints on content items. In other words, a content policy is a set of rules that users or content providers of the online system 140 must follow when submitting content to the online system for consideration to be provided to users of the system. Examples of content policies may include an adult nudity and sexual activity policy (e.g., a policy against content that shows nudity or sexually explicit content), a hate speech policy (e.g., a policy that prevents hate speech in content items), a profanity policy (e.g., a policy that prevents inappropriate words or profanity in content text or images), a spam policy (e.g., a policy that prevents spam-like content, such as chain mail content, sensationalized content, content with all capital letters or bright colors to get a user's attention, content with a landing page that is spam-like or filled with ads, etc.), a clickbait policy (e.g., a policy against content designed to get a user to click on it), an ad farm policy (e.g., a policy that prevents content that takes users to a landing page that includes more than a threshold number of ads), and a violence and graphic content policy (e.g., a policy that prevents violent displays or graphic images). These are just some examples, but there can be various different kinds of policies. In general, the policies are designed to prevent providing content to users that are negative to a user's experience in some way, or otherwise may discourage users from interacting with the online system in the future.

A content item violating a content policy may be withheld from newsfeed sent to users of the online system 140. When content is submitted to the online system by a content provider or third party system, the online system reviews the content for consideration in sending to its users. In this review, it looks at whether the content violates any of the online system's policies for content. If it violates any policy (or in some case if it violates a threshold number of policies, such as two or more policies), the content is withheld. Withheld content items are not provided to the users of the online system 140, and thus are not visible in a newsfeed to users. Examples of content items violating content policies may include content items that have direct threats to certain users or groups of users, and content items that include bullying and harassment language against users or groups of users. In some embodiments, there are policies that do not result in withholding of the content when violated, but only if more than one policy is violated. For example, a policy against biased political content might allow content to still be included in the newsfeed, but if the content also violates a second policy (e.g., a policy against angry or hateful language), these two together may result in withholding of content. However, some policies may be more of a no tolerance nature, such as sexually explicit content polices, such that violation of that policy alone results in withholding.

For each of the plurality of content policies, the shadow tagging module 170 tags content items that violate the content policy with a content policy identifier of each content policy violated. The shadow tagging module 170 may be coupled to the content store 150 and the policy store 160 as shown in FIG. 1. The shadow tagging module 170 receives a content item from the content store 150 and a content policy from the policy store 160, and determines whether or not the content item violates the content policy. For example, the shadow tagging module 170 receives a content item containing text from the content store 150 and a content policy on profanity from the policy store 160. The shadow tagging module may perform a textual string comparison to determine if the content item contains profanity. In another example, image analysis is performed on the content to determine whether profanity appears in the image.

Content items can violate policies in a number of ways. In one embodiment, a content item violates a content policy if it violates a threshold number of rules (e.g., three or more rules, such as having bright colors, all capital letters in at least one word, and includes a certain phrase, like "CLICK NOW"). The threshold may be specified by the content policy. In other embodiments, the mere appearance of a particular word in a string of text (e.g., a profanity word) results in a violation of the policy.

If the content item violates the content policy, the shadow tagging module 170 tags the content item with a content policy identifier of the content policy violated. The content item violating the content policy is tagged in a manner such that the content policy identifier is hidden from a user of the online system 140 when the user sees the content in a newsfeed. Each content item may be tagged with one or more policies that the content violates. Due to the shadow tagging, the online system can track on a per-policy basis which specific policies are violated by each content item without the user being aware that the content item is tagged in this manner.

In one embodiment, a content policy identifier may be retrieved by the shadow tagging module 170 from the policy store 160. In alternate embodiments, a content policy identifier is generated by the shadow tagging module 170 based on the content policy. If the content item does not violate the content policy, the shadow tagging module 170 does not tag the content item.

The policy validation module 235 identifies content policies to be validated from the plurality of content policies. In one embodiment, the policy validation module 235 receives a request to validate a particular content policy. The policy validation module 235 identifies a first set of users and a second set of users of the online system 140 for validation of the identified content policies. The system can the perform a test, such as an A/B test, involving these two sets of users where one set sees content that is approved, and another sees content that includes some unapproved or policy-violating content. In this A/B type test, the results of the two variations can be compared to get information about the policies and how their enforcement is affecting user experience.

In one embodiment, the cardinality of the first set of users is substantially smaller than the cardinality of the second set of users. For example, the cardinality of the first set of users is five percent or less of the cardinality of the second set of users.

For each user of the second set of users, the policy validation module 235 generates an approved content newsfeed that includes only approved content items that do not violate any of the plurality of content policies. The module 235 sends the approved content newsfeed to each user of the second set of users. Thus, these users will receive a newsfeed of content items where none of the content violates any policies.

The policy validation module 235 further identifies a subset of tagged content items that are each tagged with the content policy identifier for at least one of the identified content policies to be validated that is violated by the content item. Content items violating more than one content policy may be excluded from the validation process since it may be undesirable to provide these content items to users even for testing/validation. For each user of the first set of users, the policy validation module 235 generates an alternative newsfeed that includes (1) tagged content items from the subset of tagged content items that violate at least one of the identified content policies to be validated and (2) approved content items that do not violate any of the plurality of content policies. In other words, this set of users receives a mix of content that does and does not violate policies. And the system can track exactly which policies are violated since the content items are shadow tagged. The users may receive only a few policy-violating content items (e.g., one or two), but can also receive many (e.g., more than 10%, 20%, 30%, 40%, 50%, etc. of the content in the newsfeed. The policy validation module 235 sends the generated alternative newsfeed to the user of the first set of users.

The policy validation module 235 monitors user interactions of the first set of users with content items of the alternative newsfeed and user interactions of the second set of users with content items of the newsfeed of approved content items. Examples of monitoring user interactions may include determining a rate of user interactions of the two sets (e.g., how many times a user likes, comments on, or shares content in the feed), monitoring a length of a user session (e.g., how long the user interacts with the feed, or interacts per content item), receiving indications of user sentiment (e.g., likes of content or hides of undesired content), determining statistical aggregate values based on the user interactions (e.g., an average rate of user interactions, a histogram of rates of different types of user interactions, median, mode, or sum), and sending a request for feedback and receiving user feedback on the feed or on a per-content item basis.

The policy validation module 235 evaluates, based on each content policy identifier, the content policy that corresponds to the content policy identifier based on a comparison of the monitored user interactions of the first set of users with the monitored user interactions of the second set of users. For example, the module 235 may consider which of the approved and alternative newsfeeds gets more total interactions by users, indicating which is preferred. The module 235 may consider how many of the tagged content items receive positive or negative interactions. The module 235 may examine how long each newsfeed is interacted with, suggesting level of interest in by the users.

The policy validation module 235 modifies one or more of the plurality of content policies in response to the comparison indicating that the content policy corresponding to the content policy identifier requires adjustment to its parameters. If, for example, the alternative newsfeed is preferred by users and receives more or better interactions than the approved newsfeed, this suggests that users preferred to have at least some of the tagged content that was present only in the preferred feed. Thus, the system may lighten the policies to ensure that certain of these tagged content items are added into other newsfeeds for other users. For example, if users interacted with politically biased content, the system may remove the policy preventing this type of content, or may adjust the rules such that content items only violate this policy when they have more than a threshold level of rule violations or only when they have certain phrases or certain types of images.

The content distribution module 180 sends to other users newsfeeds including content items that conform to the modified content policy. The content distribution module 180 is coupled to the network 120 as shown in FIG. 1. In one embodiment, the content distribution module 180 sends the newsfeed including content items that conform to the modified content policy to users via the network 120, and the online system provides the content items for presentation via a client device 110. In some embodiments, the newsfeeds are provided in an application running on a client device that communicates with various remote servers managed by the online system.

The web server 230 links the online system 140 via the network 120 to the one or more client devices 110, as well as to the one or more third party systems 130. The web server 230 serves web pages, as well as other content, such as JAVA®, FLASH®, XML, and so forth. The web server 230 may receive and route messages between the online system XX40 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the content store 210. Additionally, the web server 230 may provide application programming interface (API) functionality to send data directly to native client device operating systems, such as IOS®, ANDROID™, or BlackberryOS.

Example Method for Shadow Tagging

Figure 3:
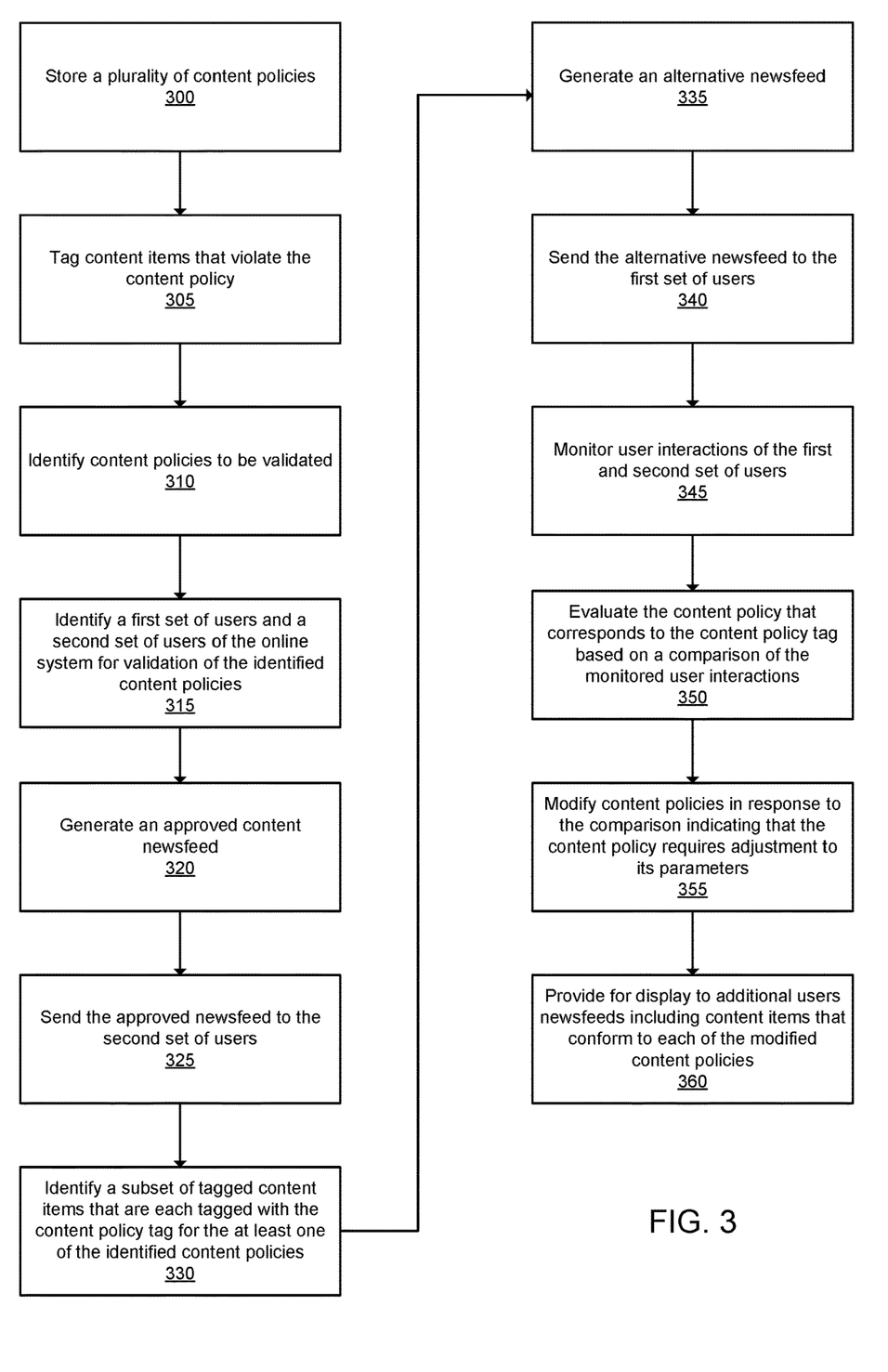
FIG. 3 is a flow chart illustrating a method for shadow tagging to evaluate policy changes, in accordance with an embodiment.

FIG. 3 is a flow chart illustrating a method for shadow tagging to evaluate policy changes, in accordance with an embodiment.

The system stores 300 a plurality of content policies. Each content policy specifies one or more constraints on content that define when a content item violating a content policy will be withheld from newsfeed sent to users of the online system.

For each of the plurality of content policies, the system tags 305 content items that violate the content policy with a content policy identifier that is specific to the content policy violated such that content items violating different content policies have different content policy identifiers.

The system identifies 310 content policies to be validated from the plurality of content policies. For example, the policy validation module may receive a request to validate a particular content policy and identifies that content policy to be validated.

The system identifies 315 a first set of users and a second set of users of the online system for validation of the identified content policies.

For each user of the second set of users, the system generates 320 and sends 325 an approved content newsfeed that includes only approved content items that does not violate any of the plurality of content policies. The system identifies 330 a subset of tagged content items that are each tagged with the content policy identifier for at least one of the identified content policies to be validated that is violated by the content item.

For each user of the first set of users, the system generates 335 and sends 340 an alternative newsfeed that includes tagged content items that violate at least one of the identified content policies to be validated and approved content items that does not violate any of the plurality of content policies.

The system monitors 345 user interactions of the first set of users with content items of the alternative newsfeed and user interactions of the second set of users with content items of the newsfeed of approved content items. The system evaluates 350, based on each content policy identifier, the content policy that corresponds to the content policy identifier based on a comparison of the monitored user interactions of the first set of users with the monitored interactions of the second set of users.

The system modifies 355 one or more of the plurality of content policies in response to the comparison indicating that the content policy corresponding to the content policy identifier requires adjustment to its parameters. The modified content policy may be stored in the policy store as a new content policy or overwrite the old content policy.

The system provides 360 for display to additional users' newsfeeds content items that conform to each of the modified content policies.

Figure 4:
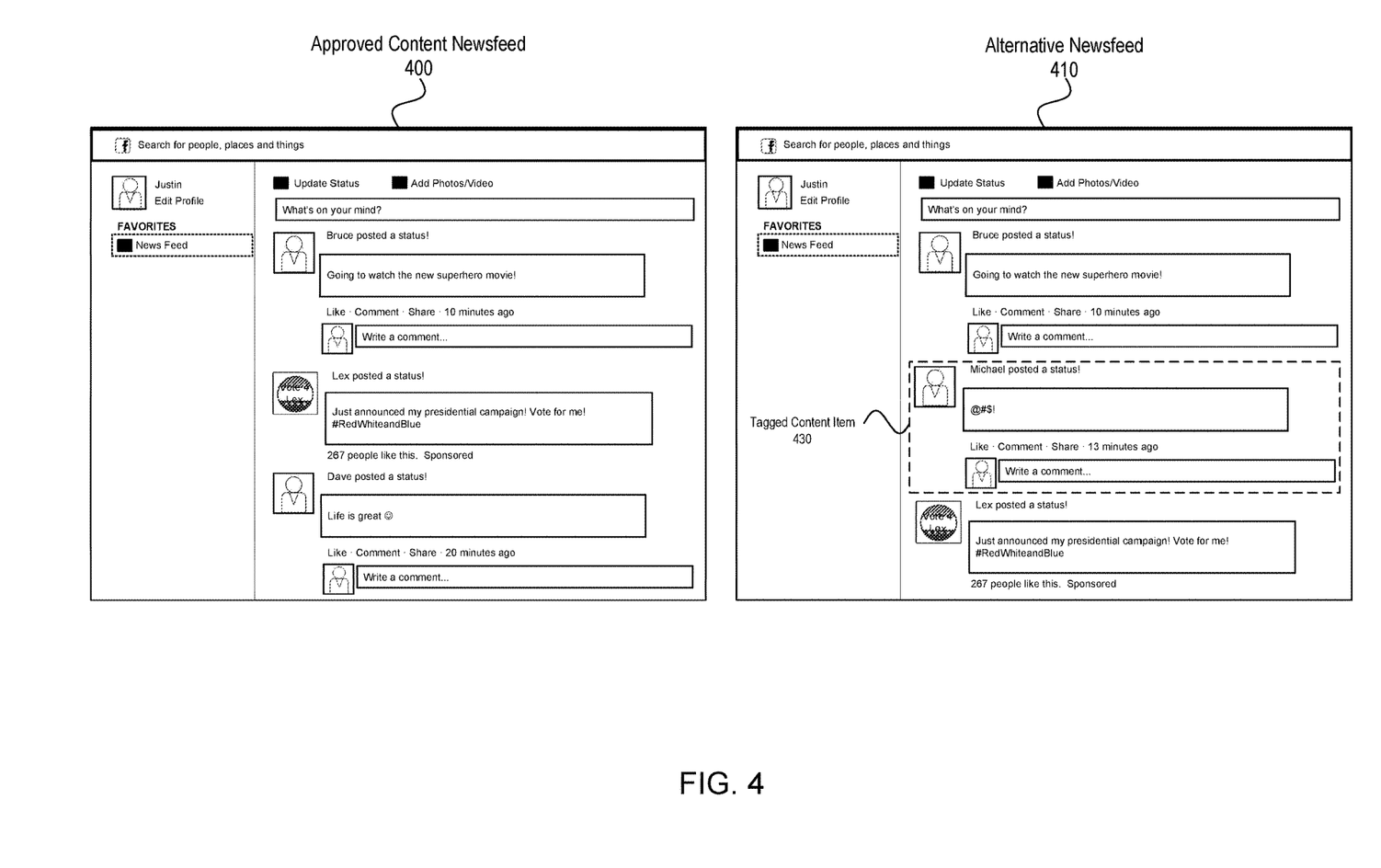
FIG. 4 is a diagram illustrating an approved content newsfeed and an alternative newsfeed, in accordance with an embodiment.

FIG. 4 is a diagram illustrating an approved content newsfeed and an alternative newsfeed, in accordance with an embodiment. The approved content newsfeed 400 is an example of what would be provided to a particular user, Justin, if he were in the second set of users identified by the policy validation module. The alternative newsfeed 410 is an example of what would be provided to Justin if he were in the first set of users identified by the policy validation module.

In the embodiment of FIG. 4, the approved content newsfeed 400 includes only approved content items that do not violate any of the plurality of content policies. The alternative newsfeed 410 includes tagged content items from the subset of tagged content items that violate at least one of the identified content policies to be validated and approved content items that do not violate any of the plurality of content policies. More specifically, the alternative newsfeed 410 includes the approved content items of the regular newsfeed 400 and a tagged content item 430 (i.e., Michael's status), as shown in FIG. 4. The tagged content item 430 contains a word that violates one of the identified content policies to be validated. As a result, the tagged content item 330 is tagged with a content policy identifier associated with the violated content policy. The user cannot see the tag and is unaware that he is receiving content items that violate specific policies.

User interactions of the first set of users with content items of the alternative newsfeed and user interactions of the second set of users with content items of the newsfeed of approved content items are monitored by the policy validation module, as described above with reference to FIGS. 2-3. Based on a comparison of the monitored user interactions, the content policy is evaluated and modified. For example, if the tagged content item 430 receives little to no user interaction (i.e., no likes or comments) over a certain duration of time, the content policy may be modified to no longer include the profanity word contained in the tagged content item 430 as a violation of the content policy. As a result, future instances of content items containing that word are not tagged with that particular content policy identifier. These content items may be considered approved content provided they do not violate other content policies.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
storing a plurality of content policies, each content policy specifying one or more constraints on content items that define when a content item violating a content policy will be withheld from newsfeed sent to users of the online system;
for each of the plurality of content policies, tagging content items that violate the content policy with a content policy identifier that is specific to the content policy violated such that content items violating different content policies have different content policy identifiers;
identifying content policies to be validated from the plurality of content policies;
identifying a first set of users and a second set of users of the online system for validation of the identified content policies;
for each user of the second set of users:
generating an approved content newsfeed that includes only approved content items that do not violate any of the plurality of content policies;
sending the approved content newsfeed to the user of the second set of users;
identifying a subset of tagged content items that are each tagged with the content policy identifier for at least one of the identified content policies to be validated that is violated by the content item;
for each user of the first set of users:
generating an alternative newsfeed that includes tagged content items from the subset of tagged content items that violate at least one of the identified content polices to be validated and approved content items that do not violate any of the plurality of content policies;
sending the generated alternative newsfeed to the user of the first set of users;
monitoring user interactions of the first set of users with content items of the alternative newsfeed and user interactions of the second set of users with content items of the newsfeed of approved content items;
evaluating, based on each content policy identifier, the content policy that corresponds to the content policy identifier based on a comparison of the monitored user interactions of the first set of users with the monitored user interactions of the second set of users;
modifying one or more of the plurality of content policies in response to the comparison indicating that the content policy corresponding to the content policy identifier requires adjustment to its parameters and
providing for display to additional users newsfeeds including content items that conform to each of the modified content policies.

2. The method of claim 1, wherein the content policy identifier is a shadow tag that is not apparent to the first set of users viewing the alternative newsfeed.

3. The method of claim 1, wherein the cardinality of the first set of users is substantially smaller than the cardinality of the second set of users.

4. The method of claim 1, wherein identifying the subset of tagged content items comprises excluding, from validation by the first and second sets of users, tagged content items that violate more than one content policy.

5. The method of claim 1, wherein monitoring user interactions comprises determining a rate of user interactions or monitoring a length of a user session.

6. The method of claim 1, wherein monitoring user interactions comprises receiving indications of user sentiment and determining statistical aggregate values based on the user interactions.

7. The method of claim 1, wherein monitoring user interactions comprises sending a request for feedback and receiving user feedback.

8. The method of claim 1, wherein a content policy is violated when a threshold number of rules specified by the policy are violated.

9. The method of claim 1, wherein modifying one or more of the plurality of content policies comprises changing the policy to strengthen or loosen requirements of the policy to adjust when content is withheld from the user based on the content policy.

10. A computer program product comprising a non-transitory computer-readable storage medium with encoded instructions, that when executed by a processor, cause the processor to:
  store a plurality of content policies, each content policy specifying one or more constraints on content items that define when a content item violating a content policy will be withheld from newsfeed sent to users of the online system;
  for each of the plurality of content policies, tag content items that violate the content policy with a content policy identifier that is specific to the content policy violated such that content items violating different content policies have different content policy identifiers;
  identify content policies to be validated from the plurality of content policies;
  identify a first set of users and a second set of users of the online system for validation of the identified content policies;
  for each user of the second set of users:
    generate an approved content newsfeed that includes only approved content items that do not violate any of the plurality of content policies;
    send the approved content newsfeed to the user of the second set of users;
  identify a subset of tagged content items that are each tagged with the content policy identifier for at least one of the identified content policies to be validated that is violated by the content item;
  for each user of the first set of users:
    generate an alternative newsfeed that includes tagged content items from the subset of tagged content items that violate at least one of the identified content polices to be validated and approved content items that do not violate any of the plurality of content policies;
    send the generated alternative newsfeed to the user of the first set of users;
  monitor user interactions of the first set of users with content items of the alternative newsfeed and user interactions of the second set of users with content items of the newsfeed of approved content items;
  evaluate, based on each content policy identifier, the content policy that corresponds to the content policy identifier based on a comparison of the monitored user interactions of the first set of users with the monitored user interactions of the second set of users;
  modify one or more of the plurality of content policies in response to the comparison indicating that the content policy corresponding to the content policy identifier requires adjustment to its parameters and
  provide for display to additional users newsfeeds including content items that conform to each of the modified content policies.

11. The computer program product of claim 10, wherein the content policy identifier is a shadow tag that is not apparent to the first set of users viewing the alternative newsfeed.

12. The computer program product of claim 10, wherein the cardinality of the first set of users is substantially smaller than the cardinality of the second set of users.

13. The computer program product of claim 10, wherein to identify the subset of tagged content items, that when executed by the processor, cause the processor to exclude, from validation by the first and second sets of users, tagged content items that violate more than one content policy.

14. The computer program product of claim 10, wherein to monitor user interactions, that when executed by the processor, cause the processor to determine a rate of user interactions or monitor a length of a user session.

15. The computer program product of claim 10, wherein to monitor user interactions, that when executed by the processor, cause the processor to receive indications of user sentiment and determining statistical aggregate values based on the user interactions.

16. The computer program product of claim 10, wherein to monitor user interactions, that when executed by the processor, cause the processor to send a request for feedback and receiving user feedback.

17. The computer program product of claim 10, wherein to modify one or more of the plurality of content policies, that when executed by the processor, cause the processor to change the policy to strengthen or loosen requirements of the policy to adjust when content is withheld from the user based on the content policy.

18. A computer-implemented method comprising:
  storing a plurality of content policies, each content policy specifying one or more constraints on content items that define when a content item violating a content policy will be withheld from newsfeed sent to users of the online system;
  for each of the plurality of content policies, tagging content items that violate the content policy with a content policy identifier that is specific to the content policy violated such that content items violating different content policies have different content policy identifiers;
  identifying a first set of users and a second set of users of the online system for validation of the identified content policies;
  for each user of the second set of users, sending to the user only approved content items that do not violate any of the plurality of content policies;
  for each user of the first set of users, sending to the user both tagged content items from the subset of tagged content items that violate at least one of the identified content polices to be validated and approved content items that do not violate any of the plurality of content policies evaluating, based on each content policy identifier, the content policy that corresponds to the content policy identifier based on a comparison of content interactions of the first set of users with content interactions of the second set of users;

modifying one or more of the plurality of content policies in response to the comparison and providing for display to additional users content items that conform to each of the modified content policies.

19. The method of claim 18 wherein the content policy identifier is a shadow tag that is not apparent to the first set of users viewing the alternative newsfeed.

20. The method of claim 18, wherein the evaluation comprises a determination that one of the first or second set of users engages more with the content in their respective newsfeeds than the other of the first or second set of users, suggesting which of the respective newsfeeds is preferable.

* * * * *